United States Patent
Bender et al.

(10) Patent No.: US 8,959,451 B2
(45) Date of Patent: Feb. 17, 2015

(54) LAUNCHING AN APPLICATION BASED ON DATA CLASSIFICATION

(75) Inventors: Christopher Lyle Bender, Waterloo (CA); Herbert Anthony Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 402 days.

(21) Appl. No.: 13/243,801

(22) Filed: Sep. 23, 2011

(65) Prior Publication Data

US 2012/0079423 A1 Mar. 29, 2012

Related U.S. Application Data

(60) Provisional application No. 61/386,303, filed on Sep. 24, 2010.

(51) Int. Cl.
*G06F 3/048* (2013.01)
*G06F 9/445* (2006.01)

(52) U.S. Cl.
CPC .................. *G06F 9/44505* (2013.01)
USPC ........... 715/778; 715/764; 715/765; 715/775; 715/804

(58) Field of Classification Search
CPC ... G06F 9/44505; G06F 3/048; G06F 3/0481; G06F 3/04817; G06F 3/0482; G06F 3/0484; G06F 21/53; G06F 9/455; G06F 11/301; G09G 5/14
USPC ........................ 715/764, 765, 775, 778, 804
See application file for complete search history.

(56) References Cited

U.S. PATENT DOCUMENTS

| | | |
|---|---|---|
| 6,292,798 B1 | 9/2001 | Dockter et al. |
| 6,405,202 B1 | 6/2002 | Britton et al. |
| 6,757,821 B1 | 6/2004 | Akiyama et al. |
| 6,772,350 B1 | 8/2004 | Belani et al. |
| 6,795,967 B1 | 9/2004 | Evans et al. |
| 6,957,330 B1 | 10/2005 | Hughes |
| 7,246,374 B1 * | 7/2007 | Simon et al. .................... 726/16 |
| 7,331,058 B1 | 2/2008 | Gladney |
| 7,694,328 B2 | 4/2010 | Joshi et al. |
| 7,802,248 B2 * | 9/2010 | Broquere et al. ................. 718/1 |

(Continued)

FOREIGN PATENT DOCUMENTS

| | | | |
|---|---|---|---|
| GB | 2408179 A | 5/2005 | |
| WO | WO-2009014975 A1 | 1/2009 | |

OTHER PUBLICATIONS

"U.S. Appl. No. 10/524,353, Non Final Office Action mailed Sep. 21, 2012", 13 pgs.

(Continued)

*Primary Examiner* — Shen Shiau
(74) *Attorney, Agent, or Firm* — Schwegman Lundberg & Woessner, P.A.

(57) ABSTRACT

Apparatus and methods provide control of the launching of an application based on data classification relative to one of a plurality of workspaces of a system. The apparatus can include operations, with respect to applications that conduct file access, to force generation of a prompt, prior to the application being launched, to receive a signal corresponding to the file access related to selection of a particular workspace, where the workspace is arranged in a structure to provide security to the plurality of workspaces. Additional apparatus, systems, and methods are disclosed.

30 Claims, 3 Drawing Sheets

(56) References Cited

U.S. PATENT DOCUMENTS

| | | | |
|---|---|---|---|
| 2001/0047485 A1 | 11/2001 | Brown et al. | |
| 2002/0019944 A1 | 2/2002 | Kou | |
| 2002/0112155 A1 | 8/2002 | Martherus et al. | |
| 2003/0126437 A1 | 7/2003 | Wheeler et al. | |
| 2005/0210270 A1 | 9/2005 | Rohatgi et al. | |
| 2005/0213763 A1 | 9/2005 | Owen et al. | |
| 2006/0021029 A1* | 1/2006 | Brickell et al. | 726/22 |
| 2006/0048099 A1* | 3/2006 | Templin et al. | 717/124 |
| 2006/0136912 A1* | 6/2006 | Robinson et al. | 718/1 |
| 2007/0260702 A1* | 11/2007 | Richardson et al. | 709/217 |
| 2008/0005472 A1* | 1/2008 | Khalidi et al. | 711/115 |
| 2008/0081609 A1 | 4/2008 | Burgan et al. | |
| 2008/0222711 A1 | 9/2008 | Michaelis | |
| 2009/0288084 A1* | 11/2009 | Astete et al. | 718/1 |
| 2010/0011447 A1 | 1/2010 | Jothimani | |
| 2010/0076946 A1* | 3/2010 | Barker et al. | 707/705 |
| 2010/0175104 A1* | 7/2010 | Khalid | 726/1 |
| 2010/0192224 A1* | 7/2010 | Ferri et al. | 726/23 |
| 2010/0217747 A1* | 8/2010 | Vitanov et al. | 707/621 |
| 2010/0274910 A1 | 10/2010 | Ghanaie-Sichanie et al. | |
| 2010/0319053 A1 | 12/2010 | Gharabally | |
| 2011/0004749 A1* | 1/2011 | Bennetts et al. | 713/100 |
| 2011/0055714 A1* | 3/2011 | Vemulapalli et al. | 715/739 |
| 2011/0145833 A1 | 6/2011 | De Los Reyes | |
| 2011/0179483 A1 | 7/2011 | Paterson et al. | |
| 2011/0209064 A1* | 8/2011 | Jorgensen et al. | 715/733 |
| 2011/0314467 A1 | 12/2011 | Pearson | |
| 2012/0054853 A1 | 3/2012 | Gupta et al. | |
| 2012/0084675 A1* | 4/2012 | Sirpal et al. | 715/761 |
| 2012/0144196 A1 | 6/2012 | Owen et al. | |
| 2012/0202527 A1 | 8/2012 | Obradovich | |

OTHER PUBLICATIONS

"U.S. Appl. No. 13/098,456, Non-Final Office Action mailed Sep. 13, 2012", 19 pgs.

"European Application Serial No. 11182822.4, Extended European Search Report mailed Aug. 8, 2012", 9 pgs.

"European Application Serial No. 11182822.4, Response filed Mar. 5, 2013 to Extended European Search Report mailed Aug. 8, 2012", 18 pgs.

"How to enable and use the "Run As" command when running programs in Windows", Article ID: 294676, [Online]. Retrieved from the Internet: <URL: http://support.microsoft.com/default/aspx?scid=kb;en-us;Q294676>, (Jun. 30, 2010), 2 pgs.

"International Application Serial No. PCT/CA2011/001058, International Search Report and Written Opinion mailed Dec. 21, 2011", 9 pgs.

"Southeast Missouri State University: "Introduction to Microsoft Word 2000"", [Online]. Retrieved from the Internet: <URL: http://www6.semo.edu/infotech/pdffiles/manuals/WebWord1.pdf>, (Accessed Jul. 24, 2012), 22 pgs.

"Canadian Application Serial No. 2,753,483, Office Action mailed Aug. 20, 2014", 3 pgs.

* cited by examiner

LAUNCHING AN APPLICATION BASED ON DATA CLASSIFICATION

RELATED APPLICATION(S)

This application claims the benefit of priority under 35 U.S.C. 119(e) to U.S. Provisional Patent Application Ser. No. 61/386,303 filed 24 Sep. 2010, which is incorporated herein by reference in its entirety.

BACKGROUND

Electronic systems can be arranged to operate on data using applications that can modify the data. To provide flexibility, electronic systems can be arranged to segregate data into groups and operate separately on the segregated data, allowing the electronic device to be operational in different environments rather than using two separate electronic devices. The segregated data can be arranged according to different criteria, depending on the multiple uses of the electronic device. Improvements to the electronic management of data and data files in an electronic device can enhance the capability of the electronic device to manage different tasks in an efficient and timely manner.

DETAILED DESCRIPTION

Figure 1:
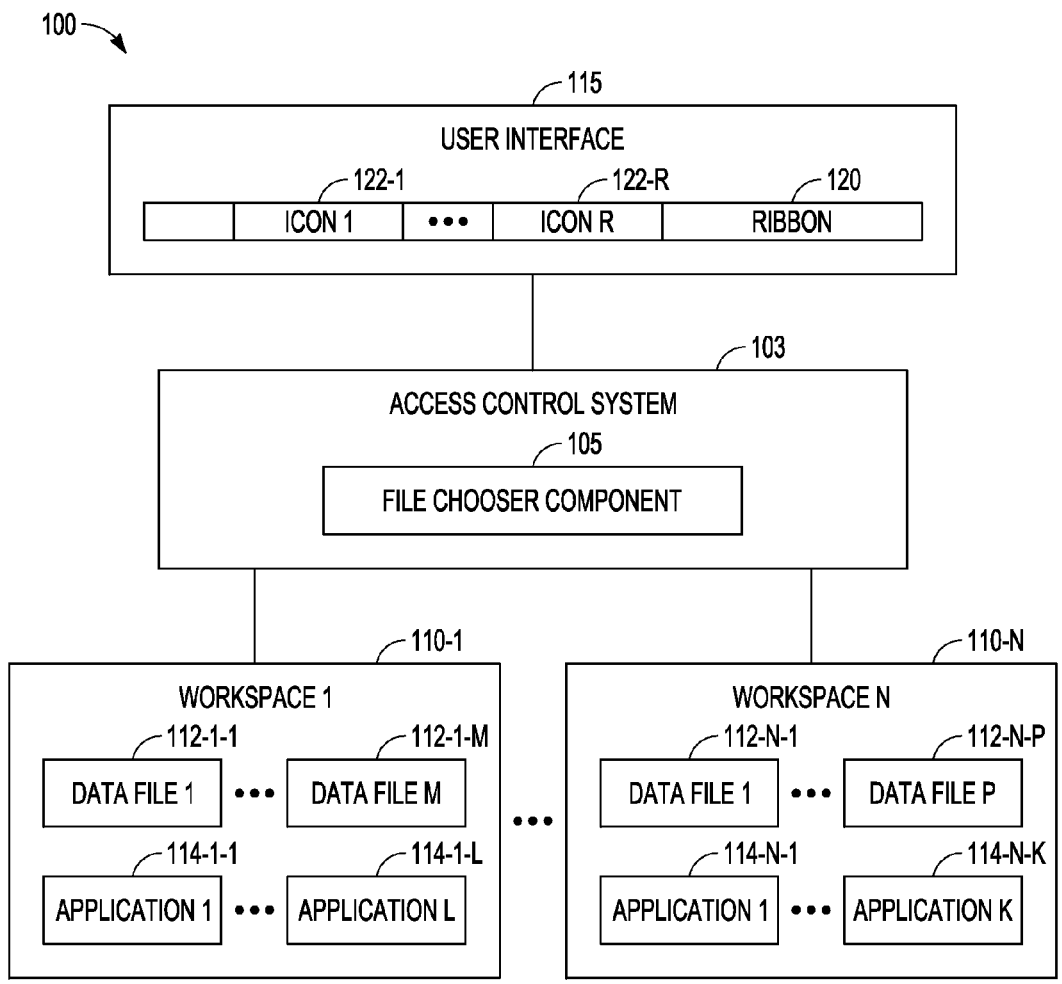
FIG. 1 shows a block diagram of an example system having a file chooser component to manage the launching of an application in one of a plurality of workspaces, according to various embodiments.

The following detailed description refers to the accompanying drawings that show, by way of illustration and not limitation, details and embodiments in which the invention may be practiced. These embodiments are described in sufficient detail to enable those skilled in the art to practice embodiments of the invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

Systems that manage storage, access, manipulation, display of data, or combinations thereof may include various apparatus such as computer systems or other systems having hardware, software, and/or hardware and software to control electronic and/or optical apparatus. In various embodiments, a personal computer (PC) can be configured to manage the launching of applications based on data classification relative to a plurality of workspaces. The plurality of workspaces can be arranged as partitioned workspaces in which data files in each workspace are operated upon separately such that data is prevented from being moved among the plurality of partitioned workspaces. A personal computer, as is generally known, herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Electronic tablets also provide the capabilities of a personal computer in a convenient portable structure. Some personal digital assistants (PDAs) may be viewed as a type of portable computer. In various embodiments, a PC may include instrumentality to operate as a wireless server. A wireless server is a server configuration that communicates with an entity over a channel established by the entities in a wireless network.

Other devices, such as mobile wireless communication devices, can be implemented to manage the launching of applications based on data classification within each mobile wireless communication device. The mobile wireless communications devices may include, but are not limited to, mobile telephones, portable computers, electronic tablets, PDAs, and other devices that may be conveniently carried by a user and provide wireless communication. Mobile telephones include wireless communication devices that have generally been referred to as cell phones. Mobile telephones may include phones capable of providing functionality of a personal computer, which portable phones may be referred to as smart phones.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is herein, and generally taken, to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine, such as a computer system or similar electronic computing device, that manipulates and transforms data represented as physical (electronic) quantities within the machine's registers and memories into other data similarly represented as physical quantities within the machine memories or registers or other such information storage, transmission, or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

Files and applications that access the files can be classified according to a workspace in which the files and/or applications are restricted. The workspace can be one of a plurality of partitioned workspaces in which each workspace is separate from each of the other workspaces such that a tightly-controlled set of resources for controlling entities such as, but not limited to, data files, network connections, and hardware and running applications that access the entities in the workspace provides a security mechanism for separating the launching and running of programs and entities in the different workspaces. Each such a workspace is generally referred to as a sandbox. Rule sets can be implemented to provide full control over what processes are started, spawned (by other applications), allowed to access entities such as, but not limited to, data files, network connections, and hardware, or allowed to inject code into other applications. Sandboxing provides a security system where data is prevented from movement between the different areas.

In an integrated sandbox model, there can be multiple modes or workspaces. An application running in one sandbox can access entities such as, but not limited to, data files, network connections, and hardware in the sandbox in which it is running, but can be restricted from accessing and operating on entities such as, but not limited to, data files, network connections, and hardware in another sandbox. In an embodiment, a single user interface (UI) can be constructed as an operating unit on top of an access control system. A user interface is a system component by which a user can interact with the system, where the system is a machine that typically includes a number of components that may be integrated or distributed. The user interface can include hardware and software components. The user interface can provide a mechanism for generating signals that generate input to the system, allowing users to utilize, manipulate, or manage the system to some degree. The user interface can provide a mechanism for generating signals that generate output from the system, allowing the system to indicate the effects of the operation of the system, which can include the effects of user input to some degree.

In various situations, different data files may be securely separated in different sandboxes, though an application may separately operate on the different data files in the different sandboxes without accessing data files outside the sandbox in which the application is running. Thus, associated with using a single user interface for multiple sandboxes is an issue as to which sandbox an application is to be launched. This issue arises because it is generally at a data or file level that some resource is flagged as falling into, or being restricted to, a sandbox. For example, the system may be partitioned into two workspaces (as secure workspaces, i.e., sandboxes) such as a corporate sandbox and a personal sandbox. The data and files in the corporate sandbox can be strictly controlled from applications or programs running the personal sandbox. This secure separation provides a security mechanism that allows a system to operate in numerous modes. The establishment of a secure separation to provide a security mechanism that allows a system to operate in numerous modes is not limited to two sandboxes and can be implemented for three or more sandboxes.

In a single user interface arrangement, icons can be displayed on a ribbon, where each icon represents a different application. An icon provides an access point to launch its respective application by selecting the icon using a selection mechanism of the user interface. When an application is launched from the icon on the ribbon in an integrated sandbox model, if the application is dedicated to a single data file or group of data files that are located in a single sandbox, then the application is placed and launched in the sandbox corresponding to the data files to which it is dedicated. If the application is not dedicated to data files in a single sandbox, the issue becomes in which sandbox to place and launch the application.

In an embodiment, for all applications that use file access or any resource that can be sandboxed (such as network connections, processors, memory chips, or other devices), prior to launching such applications, each application can be forced to prompt the user for a selection activity. A file chooser component can be activated to generate a prompt to make a selection. The file chooser component can be structured as a trusted system component that is able to view files in all sandboxes. The view and/or access to these files can be total access, read only, file name and path mode only, other viewing and/or access modes, or combinations thereof. With the files identified in all the sandboxes, a selector component for operation at the user interface can be activated that enables display of files to be accessed and/or sandboxes to be accessed by the application for user selection. For example, prior to the application being launched, a user can be prompted with a File Chooser/Explorer/Selector UI component. A non-limiting example of an execution flow includes execution of the icon from its ribbon to a file chooser to a launched application. The application can be placed in the proper sandbox based on the type of file selected relative to a data classification as being tagged to a particular sandbox.

In various embodiments, an open application that is running on a system can be forced to a selection process prior to operating on a file that the open application has not opened in its current running mode. The file chooser component of a system can be exposed through an application programming interface (API) to allow an open application to perform the following tasks at runtime: create new and open another file or delete. In both cases, the file chooser system component can be launched prior to creating a new file or prior to opening another file. If a file in the sandbox of the calling application sandbox is selected, the file can be opened in the existing application process. If a different sandbox is selected in response to being prompted to make a selection by activating the file chooser component, the system can be structured to select one of various processes in response to the selection. With the selection of a different sandbox, the system can launch a new application in the sandbox of the target file. This new application can be realized as a new instance of the open application. With the selection of a different sandbox, the system can stay the existing process in its sandbox and move the target file to the sandbox of the open application, if stored system parameters for the target file and the respective sandboxes permit such a move. With the selection of a different sandbox, the system can change the processes of the open application to the new file in the sandbox of the new file. The selection of the process used in response to the selection can be set as an operating parameter in system memory. In addition, the selection of the process used in response to the selection can be realized according to a rule set that can be alternated, where the rule set may consider various system operating parameters.

In various embodiments, a data classification assigning a sandbox to the data, or data to a sandbox, can be implemented and individual application instances can be segregated based on the sandbox classification of the data that the individual applications are accessing. The individual application segregation based on such data classification can be realized through implementation of a single user interface. An individual application can reside in a single sandbox but can appear in all sandboxes that contain files operated on or managed by the individual application through implementation of a file chooser component configured similar or identical as discussed herein. Alternatively, each sandbox containing data files operated on or managed by an individual application may contain an instance of the individual application that can be viewed by a file chooser component of a system.

FIG. 1 shows a block diagram of an embodiment of an example system 100 having a file chooser component 105 to manage the launching of an application in one of a plurality of workspaces 110-1 . . . 110-N. Workspaces 110-1 . . . 110-N are partitioned workspaces with respect to each other such that activities in one workspace operate separate from the other workspaces in the plurality of workspaces 110-1 . . . 110-N, where data is prevented from movement between the different workspaces 110-1 . . . 110-N. Each workspace can be referred to as a sandbox, providing a mechanism for secure operation separate from the other workspaces.

Data files and applications can reside in each workspace. For example, workspace 110-1 can include data files 112-1-1 . . . 112-1-R and applications 114-1-1 . . . 114-1-L and workspace 110-N can include data files 112-N-1 . . . 112-N-P and applications 114-N-1 . . . 114-N-K. Workspace 110-1 and workspace 110-N can have a different number of data files and a different number of applications assigned to operate in the respective workspaces. Applications 114-1-1 . . . 114-1-L may be different from applications 114-N-1 . . . 114-N-K or one or more of applications 114-1-1 . . . 114-1-L may be different instances of the same respective applications as applications 114-N-1 . . . 114-N-K. For instance, a word processing application may reside as different instances of the same word processing application in both workspace 110-1 and workspace 110-N or other workspaces in the plurality of workspaces 110-1 . . . 110-N. However, an application in one workspace views or provides a view in user interface 115 of corresponding files in the same workspace and does not view or provide a view in user interface 115 of all the files across the full device. The application only views or provides a view in user interface 115 of files within its domain within its workspace, i.e., sandbox. Residing in different workspaces, different instances of the same base application can be provisioned with different permissions depending on the workspace in which it operates.

File chooser component 105 can be arranged as part of an access control system 103. Alternatively, file chooser component 105 can be configured as a separate entity in system 100. File chooser component 105 can be arranged with user interface 115 to launch an application that corresponds to one of icons 122-1 . . . 122-R that is selected or activated on ribbon 120 in interface 115. The activation of one of icons 122-1 . . . 122-R can be monitored such that a signal generated from the selection of the icon can be intercepted or used to activate file chooser component 105 prior to launching the application corresponding to the activated icon. In response to the icon activation, file chooser component 105 can generate to user interface an identification of all the files in workspaces 110-1 . . . 110-N and their corresponding workspaces to user interface 115 with a prompt for selection of the appropriate file to be accessed by the application corresponding to the selected icon. Upon determining selection of the target file to be accessed, the icon-identified application can be launched in the workspace corresponding to the selected file. If the selected icon represents a target file, file chooser component 105 can be launched to prompt the user interface with the file and workspace data of all files for user selection to allow operation of the application on the file in a desired workspace.

File chooser component 105 can be arranged to monitor commands in open applications that deal with accessing data files. For example, many applications provide a create new file (new, open new file, or similar nomenclature) command and/or an open another file (open or other similar nomenclature) when the respective application is open and running. File chooser component 105 can be configured to response to a create new file command and/or an open another file command prior to the calling application being launched with respect to a new file or another file. With respect to a new file command, file chooser component 105 can prompt user interface 115 with identification of workspaces in which a new file can be created and tagged with the classification of the workspace selected. Upon selection of the workspace, the calling application or another instance of the calling application can be launched, depending on the relationship of the workspace of the calling application and the selected workspace, in the selected workspace with respect to the new file generated. With respect to an open another file command, file chooser component 105 can prompt user interface 115 with identification of all files in all workspaces, where the identification may include identification of the corresponding workspace. Upon selection of the file and hence its workspace, the calling application or another instance of the calling application can be launched, depending on the relationship of the workspace of the calling application and the workspace of the selected file, in the workspace of the selected file to be opened.

Figures 2, 3:
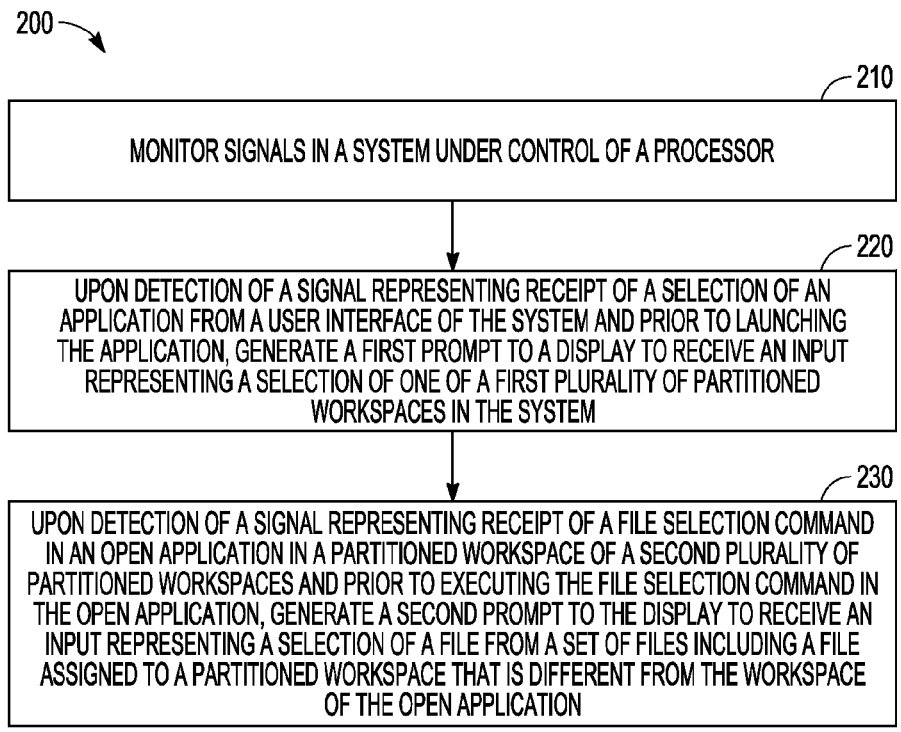
FIG. 2 shows features of a method of launching an application based on data classification, according to various embodiments.
FIG. 3 shows features of a method of launching an application based on data classification, according to various embodiments.

FIG. 2 shows features of an embodiment of a method 200 of launching an application based on data classification. At 210, signals are monitored in a system under control of a processor. At 220, upon detection of a signal representing receipt of a selection of an application from a user interface of the system and prior to launching the application, a first prompt is generated to a display to receive an input representing a selection of one of a first plurality of partitioned workspaces in the system. The partitioned workspaces of the first plurality of partitioned workspaces can be configured such that data is prevented from moving between different partitioned workspaces. A signal representing the selection in response to the first prompt can be received at the user interface prior to launching the application. At 230, upon detection of a signal representing receipt of a file selection command in an open application in a partitioned workspace of a second plurality of partitioned workspaces and prior to executing the file selection command in the open application, a second prompt is generated to the display to receive an input representing a selection of a file from a set of files including a file assigned to a partitioned workspace that is different from the workspace of the open application. The partitioned workspaces of the second plurality of partitioned workspaces can be configured such that data is prevented from moving between different partitioned workspaces. A signal representing the selection in response to the second prompt can be received at the user interface prior to executing the file selection command in the open application. The first plurality and the second plurality can be arranged as one plurality of workspaces. The second prompt generated on the display can be similar the first prompt generated on the display. Prompting of these selection procedures is forced at the user interface prior to launching the application or prior to executing the file selection command in the open application.

The file selection command in the open application can include a create new file command or an open another file command. For an open another file command, method 200 can include: launching a file chooser component in response to receipt of the open another file command; providing, using the file chooser component, an identification of each file in each accessible workspace of the plurality of workspaces to the user interface with a prompt to select one of the files; if a signal representing selection of a file in response to the prompt to select one of the files indicates the selected file is in the workspace in which the open application exists, opening the selected file in the open application; and if the signal representing selection of the file in response to the prompt to select one of the files indicates the selected file is in a different workspace from the workspace in which the open application exists, launching a new instance of the application in the accessible workspace in which the selected file exists or moving the existing open application to the accessible workspace in which the selected file exists or, if allowed by policy, moving the selected file to the current workspace.

For a create new file command, method 200 can include: launching a file chooser component in response to the create new file command; providing, using the file chooser component, an identification of each accessible workspace of the plurality of workspaces to the user interface with a prompt to select one of the accessible workspaces; if a signal representing selection of an accessible workspace in response to the prompt to select one of the accessible workspaces indicates the selected accessible workspace is the workspace in which the open application exists, opening the new file in the open application; and if a signal representing selection of the accessible workspace in response to the prompt to select one of the accessible workspaces indicates the selected accessible workspace is different from the workspace in which the open application exists, launching a new instance of the application in the selected accessible workspace or moving the existing open application to the selected accessible workspace.

The signal representing receipt of the selection of an application can include a signal representing receipt of a selection of an icon representing the application. With respect to selection of an icon representing an application, method 200 can include: launching a file chooser component in response to the signal representing receipt of the selection of the icon; providing, using the file chooser component, an identification of each file in each accessible workspace of the plurality of workspaces to the user interface with a prompt to select one of the files; and opening the application in the accessible workspace to which the selected file is assigned.

FIG. 3 shows features of an embodiment of a method 300 of launching an application based on data classification. At 310, a file chooser component is activated in a system under control of a processor in response to receipt of a signal representing a selection of an application in a user interface or in response to receipt of a signal representing a file selection command in the user interface. At 320, a plurality of partitioned workspaces in a memory of the system or accessible files assigned to each partitioned workspace or both the plurality of partitioned workspaces and the accessible files. The determination can be conducted using the file chooser component. At 330, a prompt to the user interface is generated for receipt of a signal representing a selection associated with the plurality of partitioned workspaces. The file chooser component can be activated in response to detection of a signal activating an icon representing the application, and generating the prompt to the user interface can include displaying the accessible files assigned to each partitioned workspace of the plurality. The file chooser component can be activated in response to receipt of a new file command in an open application, and generating the prompt to the user interface can include displaying each partitioned workspace of the plurality. The file chooser component can be activated in response to receipt of an open another file command in an open application, and generating the prompt to the user interface can include displaying the accessible files assigned to each partitioned workspace of the plurality. The identified accessible files in a partitioned workspace can be all the data files in the partitioned workspace. Depending on permissions for an authorized user or for an application, the accessible files in a workspace can be less than all the data files in the workspace. At 330, in response to the receipt of the signal representing the selection, the application is launched or an open application corresponding to the file selection command is launched.

Various embodiments or combination of embodiments for apparatus and methods for a system, such as a PC, a mobile device, such as a mobile wireless communications device, and/or other computing device to manage execution of applications based on data classification of the data on which the applications are selected to operate, such as being launched based on data classification, as described herein, can be realized in hardware implementations, software implementations, and combinations of hardware and software implementations. The data classification can be realized by tagging a data file to one of a plurality of partitioned workspaces, which is a plurality of workspaces partitioned such that each workspace is separate from the other workspaces, where data is prevented from movement between the different workspaces. These implementations may include a machine-readable device having machine-executable instructions, such as a computer-readable device having computer-executable instructions, for operating a system having workspaces partitioned to provide a secure mechanism for operating on data files separately in each workspace. The machine-readable device is not limited to any one type of device. Machine-readable storage devices may include, but are not limited to, solid-state memories, optical devices, and magnetic devices. Non-limiting examples of machine-readable storage devices include, but are limited to, hard disks, removable magnetic disks, removable optical disks (e.g., compact disks and digital video disks), magnetic cassettes, memory cards, memory sticks, Random Access Memories (RAMs), Read Only Memories (ROMs), and other storage devices.

In various embodiments, a machine-readable storage device stores instructions, which when the instructions are executed by a processor, cause the machine to perform operations comprising: monitoring signals in a system under control of the processor; upon detection of a signal representing receipt of a selection of an application from a user interface of the system and prior to launching the application, generating a first prompt to a display to receive an input representing a selection of one of a first plurality of partitioned workspaces in the system, the partitioned workspaces of the first plurality configured such that data is prevented from moving between different partitioned workspaces, and receiving, at the user interface, a signal representing the selection in response to the first prompt; and upon detection of a signal representing receipt of a file selection command in an open application in a partitioned workspace of a second plurality of partitioned workspaces, the partitioned workspaces of the second plurality configured such that data is prevented from moving between different partitioned workspaces, and prior to executing the file selection command in the open application, generating a second prompt to the display to receive an input representing a selection of a file from a set of files including a file assigned to a partitioned workspace that is different from the workspace of the open application, and receiving, at the user interface, a signal representing the selection in response to the second prompt.

The file selection command in the open application can include a create new file command or an open another file command. For an open another file command, the instructions can include instructions to: launch a file chooser component in response to receipt of the open another file command; provide, using the file chooser component, an identification of each file in each accessible workspace of the plurality of workspaces to the user interface with a prompt to select one of the files; if a signal representing selection of a file in response to the prompt to select one of the files indicates the selected file is in the workspace in which the open application exists, opening the selected file in the open application; and if the signal representing selection of the file in response to the prompt to select one of the files indicates the selected file is in a different workspace from the workspace in which the open application exists, launch a new instance of the application in the accessible workspace in which the selected file exists or move the existing open application to the accessible workspace in which the selected file exists or, if allowed by policy, move the selected file to the current workspace.

For a create new file command, the instructions can include instructions to: launch a file chooser component in response to the create new file command; provide, using the file chooser component, an identification of each accessible workspace of the plurality of workspaces to the user interface with a prompt to select one of the accessible workspaces; if a signal representing selection of an accessible workspace in response to the prompt to select one of the accessible workspaces indicates the selected accessible workspace is the workspace in which the open application exists, open the new file in the open application; and if a signal representing selection of the accessible workspace in response to the prompt to select one of the accessible workspaces indicates the selected accessible workspace is different from the workspace in which the open application exists, launch a new instance of the application in the selected accessible workspace or move the existing open application to the selected accessible workspace.

The signal representing receipt of the selection of an application can include a signal representing receipt of a selection of an icon representing the application. With respect to the signal representing receipt of the selection of an icon representing an application, instructions can include instructions to: launch a file chooser component in response to the signal representing receipt of the selection of the icon; provide, using the file chooser component, an identification of each file in each accessible workspace of the plurality of workspaces to the user interface with a prompt to select one of the files; and open the application in the accessible workspace to which the selected file is assigned.

In various embodiments, a machine-readable storage device can store instructions, which when the instructions are executed by a processor, cause the machine to perform operations comprising: activating a file chooser component in a system under control of a processor in response to receipt of a signal representing a selection of an application in a user interface or in response to receipt of a signal representing a file selection command in the user interface; determining a plurality of partitioned workspaces in a memory of the system or accessible files assigned to each partitioned workspace or both the plurality of partitioned workspaces and the accessible files, the determination conducted using the file chooser component; generating a prompt to the user interface for receipt of a signal representing a selection associated with the plurality of partitioned workspaces; and in response to the receipt of the signal representing the selection, launching the application or launching an open application corresponding to the file selection command. The file chooser component can be activated in response to detection of a signal activating an icon representing the application, and generating the prompt to the user interface can include displaying the accessible files assigned to each partitioned workspace of the plurality. The file chooser component can be activated in response to receipt of a new file command in an open application, and generating the prompt to the user interface can include displaying each partitioned workspace of the plurality. The file chooser component can be activated in response to receipt of an open another file command in an open application, and generating the prompt to the user interface can include displaying the accessible files assigned to each partitioned workspace of the plurality. The identified accessible files in a partitioned workspace can be all the data files in the workspace. Depending on permissions for an authorized user or for an application, the accessible files in a workspace can be less than all the data files in the workspace.

Figure 4:
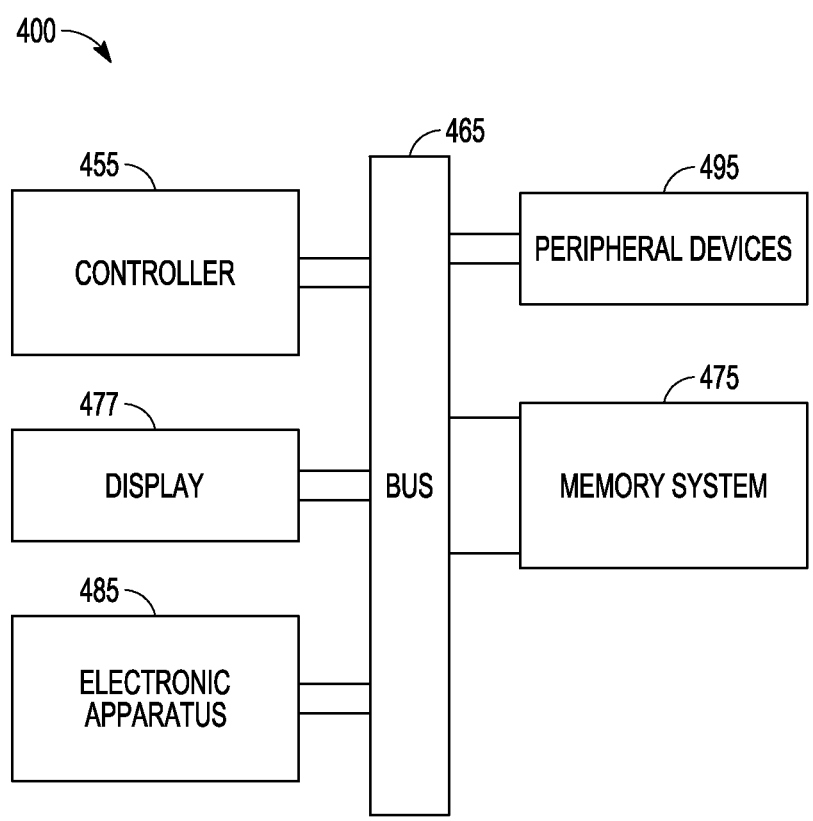
FIG. 4 depicts a block diagram of an example system having a controller and a memory system, according to various embodiments.

FIG. 4 depicts a diagram of an embodiment of a system 400 having a controller 455 and a memory system 475 that can include a single user interface over a plurality of partitioned workspaces. System 400 also includes display 477, electronic apparatus 485, and a bus 465, where bus 465 provides electrical conductivity among the components of system 400. In an embodiment, bus 465 includes an address bus, a data bus, and a control bus, each independently configured. In an alternative embodiment, bus 465 uses common conductive lines for providing one or more of address, data, or control, the use of which is regulated by controller 455. Bus 465 may be realized as multiple busses. In an embodiment, electronic apparatus 485 comprises additional memory configured in a manner similar to memory system 475. Electronic apparatus 485 may be configured to include one or more media players. In an embodiment, additional peripheral device or devices 495 are coupled to bus 465. In an embodiment, peripheral devices 495 include displays, additional storage memory system, and/or other control devices that may operate in conjunction with controller 455 and/or memory system 475. In an embodiment, controller 455 is realized as one or more processors.

Controller 455, memory system 475, display 477, electronic apparatus 485, and peripheral devices 495 can be arranged to manage execution of applications based on data classification of the data on which the applications are selected to operate in system 400. Memory system 475 can be arranged as a number of different types of memory in which workspaces can be logically defined providing a plurality of partitioned workspaces. Memory system 475 can include logic to operate these partitioned workspaces as separate workspaces using an integrated sandbox model that provides a security mechanism in which data is prevented from moving from one workspace to another workspace. In addition, applications, which access and operate on the data, function within the workspace in which the data resides. This relationship between data and partitioned workspace provides a classification tag for the data that can be used when launching applications relative to the data. In various embodiments, a method and associated system components include reviewing data and/or data files, assigning the data and/or data files to one of a plurality of partitioned workspaces, and generating a data classification based on assigning the data and/or data files to the respective partitioned workspace. The partitioned workspaces can be controlled according to an integrated sandbox model of a plurality of sandboxes.

In various embodiments, system 400 can be realized as a number of electronic systems. System 400 can be arranged as a mobile device. The mobile device can be a mobile wireless communications device. System 400 can be arranged as a PC. The PC can include instrumentality distributed throughout the PC to operate as a wireless server. System 400 can be arranged as an electronic tablet. System 400 can be arranged as any device that manages storage, access, manipulation, and display of data in which a plurality of workspaces are controlled as a plurality of partitioned workspaces in which data is stored and operated on within a workspace with a security mechanism that the data is prevented from moving from one workspace to another workspace. In such an arrangement, system 400 is configured in an integrated sandbox model with an additional parameter that data files are classified according to the workspace in which the data files reside. System 400 is configured to launch applications that access data based on the data classification associated with the plurality of partitioned workspaces of the integrated sandbox model. This data classification provides a mechanism for system 400 to prompt file selection based on identification of the appropriate workspace in which to launch the application to operate on the selected file prior to launching the application.

In various embodiments, a system, similar to or identical to systems described herein, can be realized as a mobile wireless communications device or an electronic tablet with a memory having two or more partitioned workspaces in which applications run separate from each other in these workspaces, where data is prevented from movement between the different areas. Such mobile wireless communications devices or electronic tablets can operate as having an integrated sandbox model having a plurality of sandboxes. For example, the set of workspaces can include a corporate space and a personal space, where, although on a single device, these workspaces can be fully separated. With this configuration data can be classification as belonging to a corporate workspace (or corporate sandbox), belonging to a personal workspace (or personnel sandbox), or belonging to some other workspace implemented as a secure separate workspace in the system. The system is not limited to implementation in a mobile wireless communications device or electronic tablet and can be implemented in personal computers and other computing devices.

In various embodiments, for launching an application, a file can be selected according to the sandbox in which the file resides. A system can be arranged to derive file selection such that the system can handle launching of the application according to the sandbox attributed to the selected file.

In various embodiments, an example embodiment of a system controls launching applications in the system based on data classifications. The data classification can be generated as assignments of data files to respective workspaces in a plurality of workspaces such that data is prevented from moving between the partitioned workspaces. The system can include a processor, a memory operably coupled to the processor, a display to operate a user interface, and a file chooser component such that the processor, the memory, the display, the user interface, and the file chooser component can be configured to: monitor signals in a system under control of the processor; upon detection of a signal representing receipt of a selection of an application from the user interface of the system and prior to launching the application, generate a first prompt to the display to receive an input representing a selection of one of a first plurality of partitioned workspaces in the system, the partitioned workspaces of the first plurality configured such that data is prevented from moving between different partitioned workspaces, and receive, at the user interface, a signal representing the selection in response to the first prompt; and upon detection of a signal representing receipt of a file selection command in an open application in a partitioned workspace of a second plurality of partitioned workspaces, the partitioned workspaces of the second plurality configured such that data is prevented from moving between different partitioned workspaces, and prior to executing the file selection command in the open application, generate a second prompt to the display to receive an input representing a selection of a file from a set of files including a file assigned to a partitioned workspace that is different from the workspace of the open application, and receive, at the user interface, a signal representing the selection in response to the second prompt.

The file selection command in the open application can include a create new file command or an open another file command. The processor, the memory, the display, the user interface, and the file chooser component can be configured to: launch the file chooser component in response to receipt of the open another file command; provide, using the file chooser component, an identification of each file in each accessible workspace of the plurality of workspaces to the user interface with a prompt to select one of the files; if a signal representing selection of a file in response to the prompt to select one of the files indicates the selected file is in the workspace in which the open application exists, open the selected file in the open application; and if the signal representing selection of the file in response to the prompt to select one of the files indicates the selected file is in a different workspace from the workspace in which the open application exists, launch a new instance of the application in the accessible workspace in which the selected file exists or move the existing open application to the accessible workspace in which the selected file exists or, if allowed by policy, move the selected file to the current workspace.

The processor, the memory, the display, the user interface, and the file chooser component can be configured to: launch the file chooser component in response to the create new file command; provide, using the file chooser component, an identification of each accessible workspace of the plurality of workspaces to the user interface with a prompt to select one of the accessible workspaces; if a signal representing selection of an accessible workspace in response to the prompt to select one of the accessible workspaces indicates the selected accessible workspace is the workspace in which the open application exists, open the new file in the open application; and if a signal representing selection of the accessible workspace in response to the prompt to select one of the accessible workspaces indicates the selected accessible workspace is different from the workspace in which the open application exists, launch a new instance of the application in the selected accessible workspace or move the existing open application to the selected accessible workspace.

The signal representing receipt of the selection of an application can include a signal representing receipt of a selection of an icon representing the application. The processor, the memory, the display, the user interface, and the file chooser component can be configured to: launch the file chooser component in response to the signal representing receipt of the selection of the icon; provide, using the file chooser component, an identification of each file in each accessible workspace of the plurality of workspaces to the user interface with a prompt to select one of the files; and open the application in the accessible workspace to which the selected file is assigned.

In various embodiments, an example embodiment of a system controls launching applications in the system based on data classifications. The data classification can be generated as assignments of data files to respective workspaces in a plurality of workspaces such that data is prevented from moving between the partitioned workspaces. The system can include a processor, a memory operably coupled to the processor, a display to operate a user interface, a file chooser component such that the processor, the memory, the display, the user interface, and the file chooser component can be configured to: activate the file chooser component under control of the processor in response to receipt of a signal representing a selection of an application in a user interface or in response to receipt of a signal representing a file selection command in the user interface; determine a plurality of partitioned workspaces in a memory of the system or accessible files assigned to each partitioned workspace or both the plurality of partitioned workspaces and the accessible files, the determination conducted using the file chooser component; generate a prompt to the user interface for receipt of a signal representing a selection associated with the plurality of partitioned workspaces; and in response to the receipt of the signal representing the selection, launch the application or launch an open application corresponding to the file selection command.

The file chooser component can be configured to be activated in response to detection of a signal activating an icon representing the application and configured to generate the prompt to the user interface to include displaying the accessible files assigned to each partitioned workspace of the plurality. The file chooser component can be configured to be activated in response to receipt of a new file command in an open application and configured to generate the prompt to the user interface to include displaying each partitioned workspace of the plurality. The file chooser component can be configured to be activated in response to receipt of an open another file command in an open application and configured to generate the prompt to the user interface to include displaying the accessible files assigned to each partitioned workspace of the plurality.

Various systems can be implemented similar to or identical to systems associated with FIGS. 1-4. Various systems can be implemented similar to or identical to systems configured to operate in accordance with methods associated with FIGS. 1-4. Features of the various methods and systems discussed herein may be interchanged in accordance with the teachings provided herein.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   monitoring signals on a device under control of a processor;
   upon detection of a signal representing receipt, from a user interface of the device, of a selection of an application on the device to launch, the application being operable on data files in a first plurality of partitioned workspaces on the device, and prior to launching the application:
       generating a first prompt, in response to the detection of the signal representing receipt of the selection of the application to launch, to a display to receive an input representing a selection of one of the first plurality of partitioned workspaces on the device, the partitioned workspaces of the first plurality configured such that data is prevented from moving between different partitioned workspaces; and
       receiving, at the user interface, a signal representing the selection of the partitioned workspace in which to launch the application in response to the first prompt; and
   upon detection of a signal representing receipt of a file selection command in an open application in a partitioned workspace of a second plurality of partitioned workspaces to select a file on the device, the partitioned workspaces of the second plurality configured such that data is prevented from moving between different partitioned workspaces, and prior to executing the file selection command in the open application, automatically generating a second prompt to the display to receive an input representing a selection of a file from a set of files including a file assigned to a partitioned workspace that is different from the workspace of the open application, and receiving, at the user interface, a signal representing the selection in response to the second prompt.

2. The method of claim 1, wherein the file selection command in the open application includes a create new file command or an open another file command.

3. The method of claim 2, wherein the method includes:
   launching a file chooser component in response to receipt of the open another file command;
   providing, using the file chooser component, an identification of each file in each accessible workspace of the plurality of workspaces to the user interface with a prompt to select one of the files;
   if a signal representing selection of a file in response to the prompt to select one of the files indicates the selected file is in the workspace in which the open application exists, opening the selected file in the open application; and
   if the signal representing selection of the file in response to the prompt to select one of the files indicates the selected file is in a different workspace from the workspace in which the open application exists, launching a new instance of the application in the accessible workspace in which the selected file exists or moving the existing open application to the accessible workspace in which the selected file exists or, if allowed by policy, moving the selected file to the current workspace.

4. The method of claim 2, wherein the method includes:
   launching a file chooser component in response to the create new file command;
   providing, using the file chooser component, an identification of each accessible workspace of the plurality of workspaces to the user interface with a prompt to select one of the accessible workspaces;
   if a signal representing selection of an accessible workspace in response to the prompt to select one of the accessible workspaces indicates the selected accessible workspace is the workspace in which the open application exists, opening the new file in the open application; and
   if a signal representing selection of the accessible workspace in response to the prompt to select one of the accessible workspaces indicates the selected accessible workspace is different from the workspace in which the open application exists, launching a new instance of the application in the selected accessible workspace or moving the existing open application to the selected accessible workspace.

5. The method of claim 1, wherein the signal representing receipt of the selection of an application includes a signal representing receipt of a selection of an icon representing the application.

6. The method of claim 5, wherein the method includes:
launching a file chooser component in response to the signal representing receipt of the selection of the icon;
providing, using the file chooser component, an identification of each file in each accessible workspace of the plurality of workspaces to the user interface with a prompt to select one of the files; and
opening the application in the accessible workspace to which the selected file is assigned.

7. A method comprising:
activating a file chooser component on a device under control of a processor in response to receipt of a signal representing a selection, in a user interface, of an application on the device to launch or in response to receipt of a signal representing a file selection command in the user interface to select a file on the device;
determining a plurality of partitioned workspaces in a memory of the device or accessible files assigned to each partitioned workspace or both the plurality of partitioned workspaces and the accessible files, the determination conducted using the file chooser component;
generating automatically, prior to launching the application or launching an open application corresponding to the file selection command, a prompt to the user interface for receipt of a signal representing a selection associated with the plurality of partitioned workspaces, the generation of the prompt using the determination of the plurality of partitioned workspaces, the prompt being in response to the receipt of the signal representing the selection of the application to launch or in response to the receipt of the signal representing the file selection command; and
in response to the receipt of the signal representing the selection associated with the partitioned workspace, launching the application or launching the open application corresponding to the file selection command.

8. The method of claim 7, wherein activating the file chooser component includes activating the file chooser component in response to detection of a signal activating an icon representing the application, and generating the prompt to the user interface includes displaying the accessible files assigned to each partitioned workspace of the plurality.

9. The method of claim 7, wherein activating the file chooser component includes activating the file chooser component in response to receipt of a new file command in an open application, and generating the prompt to the user interface includes displaying each partitioned workspace of the plurality.

10. The method of claim 7, wherein activating the file chooser component includes activating the file chooser component in response to receipt of an open another file command in an open application, and generating the prompt to the user interface includes displaying the accessible files assigned to each partitioned workspace of the plurality.

11. A non-transitory machine-readable storage device that stores instructions, which when the instructions are executed by a processor, cause a device to perform operations comprising:
monitoring signals on the device under control of the processor;
upon detection of a signal representing receipt, from a user interface of the device, of a selection of an application on the device to launch, the application being operable on data files in a first plurality of partitioned workspaces on the device, and prior to launching the application:
generating a first prompt, in response to the detection of the signal representing receipt of the selection of the application to launch, to a display to receive an input representing a selection of one of a first plurality of partitioned workspaces on the device, the partitioned workspaces of the first plurality configured such that data is prevented from moving between different partitioned workspaces; and
receiving, at the user interface, a signal representing the selection of the partitioned workspace in which to launch the application in response to the first prompt; and
upon detection of a signal representing receipt of a file selection command in an open application in a partitioned workspace of a second plurality of partitioned workspaces to select a file on the device, the partitioned workspaces of the second plurality configured such that data is prevented from moving between different partitioned workspaces, and prior to executing the file selection command in the open application, automatically generating a second prompt to the display to receive an input representing a selection of a file from a set of files including a file assigned to a partitioned workspace that is different from the workspace of the open application, and receiving, at the user interface, a signal representing the selection in response to the second prompt.

12. The non-transitory machine-readable storage device of claim 11, wherein the file selection command in the open application includes a create new file command or an open another file command or delete.

13. The non-transitory machine-readable storage device of claim 12, wherein the instructions include instructions to:
launch a file chooser component in response to receipt of the open another file command;
provide, using the file chooser component, an identification of each file in each accessible workspace of the plurality of workspaces to the user interface with a prompt to select one of the files;
if a signal representing selection of a file in response to the prompt to select one of the files indicates the selected file is in the workspace in which the open application exists, opening the selected file in the open application; and
if the signal representing selection of the file in response to the prompt to select one of the files indicates the selected file is in a different workspace from the workspace in which the open application exists, launch a new instance of the application in the accessible workspace in which the selected file exists or move the existing open application to the accessible workspace in which the selected file exists or, if allowed by policy, move the selected file to the current workspace.

14. The non-transitory machine-readable storage device of claim 12, wherein the instructions include instructions to:
launch a file chooser component in response to the create new file command;
provide, using the file chooser component, an identification of each accessible workspace of the plurality of workspaces to the user interface with a prompt to select one of the accessible workspaces;
if a signal representing selection of an accessible workspace in response to the prompt to select one of the accessible workspaces indicates the selected accessible workspace is the workspace in which the open application exists, open the new file in the open application; and
if a signal representing selection of the accessible workspace in response to the prompt to select one of the accessible workspaces indicates the selected accessible workspace is different from the workspace in which the open application exists, launch a new instance of the application in the selected accessible workspace or move the existing open application to the selected accessible workspace.

15. The non-transitory machine-readable storage device of claim 11, wherein the signal representing receipt of the selection of an application includes a signal representing receipt of a selection of an icon representing the application.

16. The non-transitory machine-readable storage device of claim 15, wherein the instructions include instructions to:
launch a file chooser component in response to the signal representing receipt of the selection of the icon;
provide, using the file chooser component, an identification of each file in each accessible workspace of the plurality of workspaces to the user interface with a prompt to select one of the files; and
open the application in the accessible workspace to which the selected file is assigned.

17. A non-transitory machine-readable storage device that stores instructions, which when the instructions are executed by a processor, cause a device to perform operations comprising:
activating a file chooser component on a device under control of a processor in response to receipt of a signal representing a selection, in a user interface, of an application on the device to launch or in response to receipt of a signal representing a file selection command in the user interface to select a file on the device;
determining a plurality of partitioned workspaces in a memory of the device or accessible files assigned to each partitioned workspace or both the plurality of partitioned workspaces and the accessible files, the determination conducted using the file chooser component;
generating automatically, prior to launching the application or launching an open application corresponding to the file selection command, a prompt to the user interface for receipt of a signal representing a selection associated with the plurality of partitioned workspaces, the generation of the prompt using the determination of the plurality of partitioned workspaces, the prompt being in response to the receipt of the signal representing the selection of the application to launch or in response to the receipt of the signal representing the file selection command; and
in response to the receipt of the signal representing the selection associated with the partitioned workspace, launching the application or launching the open application corresponding to the file selection command.

18. The non-transitory machine-readable storage device of claim 17, wherein activating the file chooser component includes activating the file chooser component in response to detection of a signal activating an icon representing the application, and generating the prompt to the user interface includes displaying the accessible files assigned to each partitioned workspace of the plurality.

19. The non-transitory machine-readable storage device of claim 17, wherein activating the file chooser component includes activating the file chooser component in response to receipt of a new file command in an open application, and generating the prompt to the user interface includes displaying each partitioned workspace of the plurality.

20. The non-transitory machine-readable storage device of claim 17, wherein activating the file chooser component includes activating the file chooser component in response to receipt of an open another file command in an open application, and generating the prompt to the user interface includes displaying the accessible files assigned to each partitioned workspace of the plurality.

21. A device comprising:
a processor;
a memory operably coupled to the processor;
a display to operate a user interface;
a file chooser component such that the processor, the memory, the display, the user interface, and the file chooser component are configured to:
monitor signals on the device under control of the processor;
upon detection of a signal representing receipt, from the user interface, of a selection of an application on the device to launch, the application being operable on data files in a first plurality of partitioned workspaces on the device, and prior to launching the application:
generate a first prompt, in response to the detection of the signal representing receipt of the selection of the application to launch, to the display to receive an input representing a selection of one of the first plurality of partitioned workspaces on the device, the partitioned workspaces of the first plurality configured such that data is prevented from moving between different partitioned workspaces; and
receive, at the user interface, a signal representing the selection of the partitioned workspace in which to launch the application in response to the first prompt; and
upon detection of a signal representing receipt of a file selection command in an open application in a partitioned workspace of a second plurality of partitioned workspaces to select a file on the device, the partitioned workspaces of the second plurality configured such that data is prevented from moving between different partitioned workspaces, and prior to executing the file selection command in the open application, automatically generate a second prompt to the display to receive an input representing a selection of a file from a set of files including a file assigned to a partitioned workspace that is different from the workspace of the open application, and receive, at the user interface, a signal representing the selection in response to the second prompt.

22. The device of claim 21, wherein the file selection command in the open application includes a create new file command or an open another file command.

23. The device of claim 22, wherein the processor, the memory, the display, the user interface, and the file chooser component are configured to:
launch the file chooser component in response to receipt of the open another file command;
provide, using the file chooser component, an identification of each file in each accessible workspace of the plurality of workspaces to the user interface with a prompt to select one of the files;
if a signal representing selection of a file in response to the prompt to select one of the files indicates the selected file is in the workspace in which the open application exists, open the selected file in the open application; and
if the signal representing selection of the file in response to the prompt to select one of the files indicates the selected file is in a different workspace from the workspace in which the open application exists, launch a new instance of the application in the accessible workspace in which the selected file exists or move the existing open application to the accessible workspace in which the selected file exists or, if allowed by policy, move the selected file to the current workspace.

24. The device of claim 22, wherein the processor, the memory, the display, the user interface, and the file chooser component are configured to:

launch the file chooser component in response to the create new file command;

provide, using the file chooser component, an identification of each accessible workspace of the plurality of workspaces to the user interface with a prompt to select one of the accessible workspaces;

if a signal representing selection of an accessible workspace in response to the prompt to select one of the accessible workspaces indicates the selected accessible workspace is the workspace in which the open application exists, open the new file in the open application; and if a signal representing selection of the accessible workspace in response to the prompt to select one of the accessible workspaces indicates the selected accessible workspace is different from the workspace in which the open application exists, launch a new instance of the application in the selected accessible workspace or move the existing open application to the selected accessible workspace.

25. The device of claim 21, wherein the signal representing receipt of the selection of an application includes a signal representing receipt of a selection of an icon representing the application.

26. The device of claim 25, wherein the processor, the memory, the display, the user interface, and the file chooser component are configured to:

launch the file chooser component in response to the signal representing receipt of the selection of the icon;

provide, using the file chooser component, an identification of each file in each accessible workspace of the plurality of workspaces to the user interface with a prompt to select one of the files; and open the application in the accessible workspace to which the selected file is assigned.

27. A device comprising:

a processor;

a memory operably coupled to the processor;

a display to operate a user interface;

a file chooser component such that the processor, the memory, the display, the user interface, and the file chooser component are configured to:

activate the file chooser component under control of the processor in response to receipt of a signal representing a selection, in the user interface, of an application on the device to launch or in response to receipt of a signal representing a file selection command in the user interface to select a file on the device;

determine a plurality of partitioned workspaces in the memory of the device or accessible files assigned to each partitioned workspace or both the plurality of partitioned workspaces and the accessible files, the determination conducted using the file chooser component;

generate automatically, prior to launching the application or launching an open application corresponding to the file selection command, a prompt to the user interface for receipt of a signal representing a selection associated with the plurality of partitioned workspaces;

generate, prior to launching the application or launching an open application corresponding to the file selection command, a prompt to the user interface for receipt of a signal representing a selection associated with the plurality of partitioned workspaces, the generation of the prompt using the determination of the plurality of partitioned workspaces, the prompt being in response to the receipt of the signal representing the selection of the application to launch or in response to the receipt of the signal representing the file selection command; and in response to the receipt of the signal representing the selection associated with the partitioned workspace, launch the application or launch the open application corresponding to the file selection command.

28. The device of claim 27, wherein configured to activate the file chooser component includes configured to activate the file chooser component in response to detection of a signal activating an icon representing the application, and configured to generate the prompt to the user interface includes configured to display the accessible files assigned to each partitioned workspace of the plurality.

29. The device of claim 27, wherein configured to activate the file chooser component includes configured to activate the file chooser component in response to receipt of a new file command in an open application, and configured to generate the prompt to the user interface includes configured to display each partitioned workspace of the plurality.

30. The device of claim 27, wherein configured to activate the file chooser component includes configured to activate the file chooser component in response to receipt of an open another file command in an open application, and configured to generate the prompt to the user interface includes configured to display the accessible files assigned to each partitioned workspace of the plurality.

* * * * *